United States Patent [19]

Clarke et al.

[11] Patent Number: 5,754,759
[45] Date of Patent: May 19, 1998

[54] TESTING AND MONITORING OF PROGRAMMED DEVICES

[75] Inventors: Paul A. Clarke, Crawley; Jonathan R. Piesing, Croydon, both of England

[73] Assignee: U.S. Philips Corporation, New York, N.Y.

[21] Appl. No.: 748,454

[22] Filed: Nov. 13, 1996

Related U.S. Application Data

[63] Continuation of Ser. No. 315,278, Sep. 29, 1994, abandoned.

[30] Foreign Application Priority Data

Sep. 29, 1993 [GB] United Kingdom ............... 9320052

[51] Int. Cl.$^6$ ................................................. G06F 11/00
[52] U.S. Cl. ........................... 395/183.13; 395/183.07; 395/183.16; 364/267.91
[58] Field of Search .......................... 395/575, 400, 395/375, 180, 183.01, 182.13, 182.19, 183.07, 183.13, 183.16; 371/16.1, 19; 364/267, 267.4, 267.91, 267.8

[56] References Cited

U.S. PATENT DOCUMENTS

| | | | |
|---|---|---|---|
| 4,813,009 | 3/1989 | Tallman | 364/900 |
| 4,860,195 | 8/1989 | Krauskopf | 364/200 |
| 5,067,107 | 11/1991 | Wade | 395/500 |
| 5,115,502 | 5/1992 | Tallman | 395/500 |
| 5,127,103 | 6/1992 | Hill et al. | 395/575 |
| 5,165,027 | 11/1992 | Krauskof | 395/400 |
| 5,280,626 | 1/1994 | Kondo et al. | 395/500 |
| 5,289,587 | 2/1994 | Razban | 395/375 |

FOREIGN PATENT DOCUMENTS

| | | | |
|---|---|---|---|
| 0189848 | 8/1986 | European Pat. Off. | G06F 11/00 |
| 0435499A2 | 7/1991 | European Pat. Off. | G06F 11/00 |
| 2644607 | 3/1989 | France | G06F 9/455 |
| WO9117505 | 11/1991 | WIPO | G06F 11/26 |

OTHER PUBLICATIONS

Costella et al., "An Instrument For Concurrent Program Flow Monitoring In Microprocessor Based Systems", Publication Date: May 12–14, 1992, pp. 169–172. IEEE Instrumentation & Measurement Conference (New York).

Cheshir, "A Real–Time High–Level Language Debugging System", Thesis, Jul. 1994. The cooper union for the Advancement of Science and Art.

"Logic–analyzer Interface Assists in 68030 Program Debugging" by D. Atkins, EDN, Sep. 29, 1988, pp. 187–192.

*Primary Examiner*—Robert W. Beausoliel, Jr.
*Assistant Examiner*—Trinh L. Tu
*Attorney, Agent, or Firm*—Debra K. Stephens

[57] ABSTRACT

A monitoring apparatus includes a programmable event filter (18) which identifies the occurrence of a predetermined signal (such as a memory address location) on a signal path of a programmed device such as a CD-i player. On detection, one or more successive bus signals are captured in a buffer (20) and subsequently written to storage (14) for processing by an internal processor (10) or the bus signals are sent over a bidirectional communications link (16) to a host device implementing suitable data processing algorithms. A particular use for the monitoring apparatus is in non-intrusive debugging of programmed devices taking account of their operating systems.

14 Claims, 7 Drawing Sheets

LISTING 1

```
1   Read    0x1A1F5A    0x426A      ; clr.w ...
2   Read    0x1A1F5C    0x0008      ; ... 8(a2)
3   Read    0x1A1F5E    0x4E40      ; TRAP #0 opcode 4   Write   0x0FEC28    0x0000      ; Clear taking place 5   Write   0x0FF19A    0x0080      ; Stack frame header
6   Write   0x0FF196    0x001A      ; High PC
7   Write   0x0FF198    0x1F60      ; Low PC
8   Write   0x0FF194    0x2504      ; Status word 9   Read    0x000080    0x0000      ; High vector address
10  Read    0x000082    0x062C      ; Low vector address 11  Read    0x00062C    0x4878      ; pea.l ...
12  Read    0x00062E    0x0080      ; ... (0x80).w 13  Read    0x000630    0x4E49      ; jmp ...

14  Write   0x0FF190    0x0000      ; pea.l taking place
15  Write   0x0FF192    0x777A 16  Read    0x000632    0x0018      ; ... 0x18777A
17  Read    0x000634    0x777A 18  Read    0x18777A    0x48E7      ; movem.l ...
19  Read    0x18777C    0xFFFE      ; ... d0-d7/a0-a6, -(a7)

20  Write   0x0FF18C    0x0000      ; Save a6
21  Write   0x0FF18E    0x1500

22  Write   0x0FF188    0x001F      ; Save a5
23  Write   0x0FF18A    0xFC01

24  Write   0x0FF184    0x000F      ; Save a4
25  Write   0x0FF186    0xFA94

26  Write   0x0FF180    0x001F      ; Save a3
27  Write   0x0FF182    0xFC01

28  Write   0x0FF17C    0x000F      ; Save a2
29  Write   0x0FF17E    0xEC20

30  Write   0x0FF178    0x000F      ; Save a1
31  Write   0x0FF17A    0xED05

32  Write   0x0FF174    0x001A      ; Save a0
33  Write   0x0FF176    0x1E96
```

LISTING 1

```
34  Write   0x0FF170    0x0000      ; Save d7
35  Write   0x0FF172    0x0000

36  Write   0x0FF16C    0x0000      ; Save d6
37  Write   0x0FF16E    0x0000

38  Write   0x0FF168    0x0000      ; Save d5
39  Write   0x0FF16A    0x2000

40  Write   0x0FF164    0x0000      ; Save d4
41  Write   0x0FF166    0x01F4

42  Write   0x0FF160    0x0000      ; Save d3
43  Write   0x0FF162    0x2C96

44  Write   0x0FF15C    0x0000      ; Save d2
45  Write   0x0FF15E    0x0001

46  Write   0x0FF158    0x0000      ; Save d1
47  Write   0x0FF15A    0x0001

48  Write   0x0FF154    0x0000      ; Save d0
49  Write   0x0FF156    0x0003

50  Read    0x18777E    0x2C78      ; movea.1 ...
51  Read    0x187780    0x0000      ; ... (0).w, a6

52  Read    0x000000    0x0000      ; Read taking place
53  Read    0x000002    0x1500

54  Read    0x187782    0x286E      ; movea.1 ...
55  Read    0x187784    0x004C      ; ... 76(a6), a4

56  Read    0x00154C    0x0000      ; Move taking place
57  Read    0x00154E    0x2500

58  Read    0x187786    0x422F      ; clr.b ...
59  Read    0x187788    0x0041      ; ... 65(a7)

60  Read    0x18778A    0x2A6F      ; movea.1 ...

61  Write   0x0FF194    0x0000      ; Clear taking place

62  Read    0x18778C    0x0042      ; ... 66(a7), a5

63  Read    0x0FF196    0x001A      ; Move taking place
64  Read    0x0FF198    0x1F60

65  Read    0x18778E    0x3E15      ; movea.w (a5), a7

66  Read    0x1A1F60    0x0084      ; I$Open function code
```

LISTING 2

| 1 | Read  | 0x187572 | 0x6600 | ; move.w d0, (a0)+ |
|---|-------|----------|--------|---------------------|
| 2 | Read  | 0xFFFFF8 | 0xFF80 | ; Fetch vector number (0x80) |
| 3 | Write | 0x05D436 | 0x0200 | ; Stack frame header |
| 4 | Write | 0x05D432 | 0x0018 | ; High PC |
| 5 | Write | 0x05D434 | 0x7572 | ; Low PC |
| 6 | Write | 0x05D430 | 0x2004 | ; Status word |
| 7 | Read  | 0x000200 | 0x0000 | ; High vector address |
| 8 | Read  | 0x000202 | 0x09EC | ; Low vector address |
| 9 | Read  | 0x0009EC | 0x4878 | ; Jump to vector's contents |

LISTING 3

| 50 | Read  | 0x18777E | 0x2C78 | ; movea.l ... |
|----|-------|----------|--------|---------------|
| 51 | Write | 0x0FF152 | 0x00F4 | ; Stack frame header |
| 52 | Write | 0x0FF14E | 0x0018 | ; High PC |
| 53 | Write | 0x0FF150 | 0x777E | ; Low PC |
| 54 | Write | 0x0FF14C | 0x2004 | ; Status word |
| 55 | Read  | 0x0000F4 | 0x0000 | ; High vector address |
| 56 | Read  | 0x0000F6 | 0x074E | ; Low vector address |
| 57 | Read  | 0x00074E | 0x4878 | ; Jump to vector's contents |

LISTING 4

| 1 | Read | 0x18762C | 0x4E73 | ; RTE |
|---|------|----------|--------|-------|
| 2 | Read | 0x0FD4B8 | 0x0000 | ; Status word |
| 3 | Read | 0x0FD4BE | 0x0080 | ; Stack frame header |
| 4 | Read | 0x0FD4BA | 0x000F | ; High PC |
| 5 | Read | 0x0FD4BC | 0x4142 | ; Low PC |
| 6 | Read | 0x0F4142 | 0x2C78 | ; movea.l ... |

LISTING 5

```
0   Read    0x1887EE    0x4E90   ; jsr (a0)
1   Read    0x191900    0x2469   ; Read of opcode
2   Write   0x0FD444    0x0018   ; Write PC high
3   Write   0x0FD446    0x87F0   ; Write PC low
4   Read    0x191902    0x0004   ; Next opcode
```

LISTING 6

```
0   Read    0x1885BE    0x61E2   ; bsr disp=0xE2
1   Read    0x1885A2    0x0C40   ; Read of opcode
2   Write   0x0FD45C    0x0018   ; Write PC high
3   Write   0x0FD45E    0x85C0   ; Write PC low
4   Read    0x1885A4    0x0020   ; Next opcode
```

LISTING 7

```
1   Write   STACK - 2   HEADER          ; LRWN6 = 0, LD6 & 0xF000 = 0
2   Write   STACK - 6   HIGH_PC         ; LRWN5 = 0
3   Write   STACK - 4   LOW_PC          ; LRWN4 = 0
4   Write   STACK - 8   STATUS          ; LRWN3 = 0
5   Read    VECTOR      HIGH_NEW_CODE   ; LRWN2 = 1, LA2 = LD6
6   Read    VECTOR + 2  LOW_NEW_CODE    ; LRWN1 = 1
7   Read    NEW_CODE    OPCODE          ; LRWN0 = 1, LA0 = (LD2 << 8) | L
```

LISTING 8

```
1   Read    STACK       STATUS          ; LRWN4 = 1
2   Read    STACK + 6   HEADER          ; LRWN3 = 1, LD3 & 0xF000 = 0
3   Read    STACK + 2   HIGH_NEW_CODE   ; LRWN2 = 1
4   Read    STACK + 4   LOW_NEW_CODE    ; LRWN1 = 1
5   Read    NEW_CODE    OPCODE          ; LRWN0 = 1, LA0 = (LD2 << 8) |
```

LISTING 9

```
1   Read    CODE        0x48E7      ; LRWN1 = 1, LD1 = 0x48E7
2   Read    CODE + 2    0xFFFE      ; LRWN0 = 1, LD0 = 0xFFFE
```

LISTING 10

```
1   Read    CODE    0x3E15      ; LRWN1 = 1, LD1 = 0x3E15
2   Read    DATA    FUNCTION    ; LRWN0 = 1
```

LISTING 11

```
CYCLE  -MODULE-  -ADDR-  DATA  ACCESS  -------INTERPRETATION-------
00905  kernel    18A1FC  722E  Read    moveq    #$2E,d1

00906  kernel    18A1FE  E249  Read    lsr.w    #1,d1

00907  kernel    18A200  74FF  Read    moveq    #$FF,d2

00908  kernel    18A202  3018  Read    move.w   (a0)+,d0

00909            92CBC0  4AFC  Read    move.w   manifest cycle 00910  kernel    18A204  B142  Read    eor.w    d0,d2

00911  kernel    18A206  51C9  Read    dbf      d1,...
00912  kernel    18A208  FFFA  Read             ...$FFFA
00913  kernel    18A202  3018  Read    move.w   (a0)+,d0

00914            92CBC2  0001  Read    move.w   manifest cycle 00915  kernel    18A204  B142  Read    eor.w    d0,d2

00916  kernel    18A206  51C9  Read    dbf      d1,...
00917  kernel    18A208  FFFA  Read             ...$FFFA
```

TESTING AND MONITORING OF PROGRAMMED DEVICES

This is a continuation of application Ser. No. 08/315,278, filed Sep. 29, 1994, now abandoned.

The present invention relates to a method and apparatus for the monitoring of operation of programmed processor-based devices. Such monitoring facilitates debugging, that is to say the identification of coding errors in a program and facilitates a 'profiling' capability which is the analysis of software timing and performance.

When writing computer programs, a software engineer will frequently make use of a debugging tool. This tool provides the programmer with a great deal of control over the running of a program, by enabling the execution of individual processor instructions or sections of instructions such that the correct operation of individual parts of a program may be verified.

The traditional (intrusive) method of debugging is to use an interactive debugging utility allowing breakpoints to be placed at predefined points in a program. On reaching a breakpoint, program execution is suspended and examination of the state of the system may be made. It is this suspension which can cause problems: stopping execution of a program can cause a break in a long sequence of time critical operations. Nevertheless, analysis of processor activity within these operations may be required.

Traditional debugging tools allow the values of registers within the processor to be examined and modified, together with the manipulation of other subsystems (such as I/O ports or memory) within the computer system. The presence of an operating system running on the computer is however completely ignored. Operating systems frequently contain timing-critical sections of code, together with codes that may be executed on the unpredictable occurrence of an external interrupt. The execution of these types of code cannot be considered by traditional debugging tools which only trace operation within a program and themselves use facilities of the operating system such as keyboard entry or screen display.

Non-intrusive debuggers adapted to high level languages such as C still approach the task of program debugging along the lines of a "program" which defines a sequence of actions that a "processor" executes in turn. An example of a high level language debugging system is described in U.S. Pat. No. 5,127,103 (Hill et al). High level language debugging systems require knowledge of the compiler in addition to knowledge of the processor monitored. Additionally, they will still encounter problems when events occur which do not conform to expected language commands, for example systems calls which are not due to jump or branch subroutines. High level languages make use of local variables within each function.

These are stored in a stack frame in memory for the duration of the function in which they are used. The system described by Hill monitors the creation of these stack frames, and subsequent accesses to them, to determine the values of local variables in a function.

There are many systems, for example consumer products such as Compact Disk-Interactive (CD-i) players, where performance has to be "squeezed" from the processor, that is to say for economic reasons a smaller processor operating at the limit of its capabilities is preferred to a more powerful (but expensive) device. The operating system and other software that runs on such systems is written in assembly language for reasons of efficiency. Assembly language programs do not use local variables stored in a stack frame, but instead store local data in the processor's registers. Storage in registers means that external memory does not need to be accessed each time a local variable is used and hence performance is increased. With such assembly level systems, where external memory use is minimised, high level language debugging systems (such as that of Hill referred to above) cannot provide comprehensive monitoring.

For example, if an application makes a call to the operating system to load a disk sect or into memory then a high level language debugging tool will treat the system call as a single program statement. The traditional debugging tool treats the system call as an indivisible event, and moves on to consider the next processor instruction When the operating system returns program execution to the application (after a successful or unsuccessful sector load). What may actually, happen when the system call is made on a modern multi-tasking operating system is that the processor informs the disk controller to load a certain sector and then switches to another application that may be running at the same time until it is informed that the load is complete. Loading by the disk controller may involve control of the disk drive, claiming the system bus so that the processor cannot execute any further instructions, using Direct Memory Access (DMA) to store the data contained in the disk sector in the required memory addresses, releasing the bus so that processor execution resumes, and causing an interrupt which causes another section of the operating system to set a flag indicating that the disk sector load has completed, so that the original system call can return.

An alternative to traditional debugging techniques is the use of an In Circuit Emulator (ICE), an example of which is described in U.S. Pat. No. 5,280,626 (Kondo et al) published Jan. 18th 1994. Here the processor in a computer system is replaced with a test fixture which connects to the ICE apparatus which mimics the processor but under programmer control. It is similar in some aspects to the traditional debugger but the programmer is exposed to the operating system code as no distinction is made between application and operating system instructions.

A further known technique is the use of logic analyzers connected to points within the computer system to produce timing and state information of available signals. Here a computer system is treated as a complex signal generator and the logic analyzer merely reports these signals to the programmer for analysis eased on knowledge and preconceptions of the system. In order to assist with this, a logic analyzer interface may be used, as described in "Logic-analyzer Interface Assists in 68030 Program Debugging" by Don Atkins, EDN, Sep. 29th 1988, pp. 187–192. In addition to making available the signals at points conventionally monitored, the interface described assists the programmer by generating a number of additional "qualifier" signals from the conventionally monitored signals to indicate, for example, "processor halted", "exception pending", or "instruction executed".

SUMMARY OF THE INVENTION

It is an object of the present invention to provide non-intrusive monitoring which does not affect normal operation of a computer system being monitored.

It is another object of the present invention to enable real time monitoring of computer systems whilst taking account of the computer operating system.

In accordance with the present invention there is provided a method of monitoring the operation of a programmed processor-based device, comprising the steps of:

determining an electronic signal of the device representative of a predetermined processor operating system event;

monitoring, from a position external but coupled to the processor operating system, for occurrence of the said representative signal on a signal path of the device; and on detection of occurrence of the said representative signal, capturing and reporting predetermined details of the processor operating system event.

Also in accordance with the present invention there is provided apparatus for monitoring the operation of a programmed processor-based device comprising:

filter means connectable to a signal path of the processor-based system and operable to detect occurrence of at least one predetermined system signal representative of a particular processor operating system event;

an event cache memory connected to the filter means, the filter means being operable to write preselected event details to the cache memory on detection of an event;

an event data storage memory connected to the filter means and operable to store captured event details read from the cache memory via the filter means; and processor circuitry connected to, and controlling operation of, the filter means and event data storage memory.

Other features of the invention are defined in the attached claims, to which reference should now be made. With the monitoring method of the present invention, debugging and profiling could be done in real time (such as dynamic bar charts showing instantaneous interrupt frequency), or as a review of stored data received from the debugging hardware. Selecting specific events could produce a display of parameters passed or executing time for that event.

By supplying the debugging system with a symbol table or memory map the non-intrusive debugging system could provide an execution history or give a backtrack record following a system failure. A triggering capability could enable the user to specify specific subroutines of an application that should trigger the start of analysis. Data captured by the hardware could be stored for later analysis or comparison.

The main advantages of this system over the existing methods discussed above can be summarised as follows:

Monitoring can be carried out on the computer system with no interference (in terms of additional memory usage, unusual loading, or run-times interruption) from the monitoring apparatus. This is not the case with the traditional debugging tool.

As knowledge of the operating system is employed in interpretation of data gained from the new apparatus, interactions between the operating system and the application can be explored fully. This is not the case with any of the existing methods.

Debugging of the complete 'system' (i.e.: hardware configuration, operating system and application in combination) can be performed. This is not the case with either a traditional debugging tool or an ICE, and automation of interpretation of debugging data removes the unreliable nature of debugging found with logic analyzers.

BRIEF DESCRIPTION OF THE DRAWINGS

One particular preferred embodiment of the present invention will now be described, by way of example only, and with reference to the accompanying drawings in which.

DESCRIPTION OF THE PREFERRED EMBODIMENT

A particular, but not exclusive, use for the method and apparatus of the present invention is in the provision of a hardware debugging tool for CD-I devices which has awareness of characteristics of the OS-9 operating system used by such devices. The following description is of such a debugging tool, although it will be readily apparent to the skilled person how the invention may be applied for, for example, operating systems other than OS-9.

Timing problems which reduce the effectiveness of traditional debugging methods occur because the CD-I player is a multi-tasking environment. Whilst an application is running, the processor may also be performing other tasks such as updating the display or reading from the CD drive. Furthermore, devices connected to the system (such as a roller-controller) generate interrupts to the processor when activated, and these demand processor activity to take the appropriate action. The effect of this multi-tasking environment is that analysis of an application using traditional debugging does not show all processor activity. With the increasing complexity of CD-I titles (such as action games and Digital Video titles), applications will be demanding greater processor time and it will become more important to analyze the complete processor activity rather than just an application in isolation.

Non-intrusive debugging is concerned with deducing what a CD-I player is doing whilst it is actually executing code. This is achieved by monitoring the signals available on the expansion bus in a CD-I player. Algorithms are then used to filter the bus activity so that specific events can be detected. These events are detected by monitoring instruction fetches from memory and other bus activity such as writes to the system stack, and include the following:

System calls

Storage of all registers on the system stack during system call processing allowing parameters passed to the system to be detected.

Interrupts from devices such as timers or the CD player.

System calls made within interrupts or other system calls.

Returns from interrupts.

Subroutine calls and returns.

Predefined memory accesses.

During traditional intrusive debugging, breakpoints are commonly placed before or after subroutine calls and system calls. This is to allow the programmer to verify that the correct call is made, and that the desired parameters are passed. It is thus especially useful that non-intrusive debugging can detect subroutine calls and system calls and can provide the parameters passed to a system call without halting the player. Furthermore, as system calls can perform further system calls (which may not be available to the programmer with intrusive debugging due to them residing within the operating system), the non-intrusive approach allows a finer granularity of debugging.

During non-intrusive debugging, a programmer can make use of an interactive debugging tool on a debugging host to analyze processor activity. Instantaneous levels of particular activity (such as interrupt or system call occurrence) may be determined in real-time, and analysis of stored data allows parameters passed to system calls to be examined or subroutine backtracking to be made following a CD-I player system failure.

Simple profiling can be performed by combining non-intrusive interrupt, subroutine call, and system call detection with timing information. In this way the proportion of processor time spent performing given tasks can be determined and tuned if required. Armed with this information a programmer can optimise a section of code for speed.

An application makes a system call using a TRAP #0 instruction which in OS-9 produces a standard pattern of bus activity. This includes a read from program memory of the TRAP #0 opcode and vector number (0x4E40), a write to system stack of a short stack frame, a read of the vector's contents, and a jump to that address. Following this, all registers are saved to the system stack and the system function code is read from the memory location following the TRAP instruction. After the system call is serviced (which may involve further system calls) the registers are restored and the trap returns. It can be seen that the contents of each register in the system can be determined every time a system call occurs provided the monitoring hardware of the debugging system can identify the start of a TRAP #0 operation.

Parameters are passed to a system function by loading them into the required registers before the system call is made. By analysing the writes of all registers to the system stack these parameters can be identified. The system call function code can be determined when it is read from program memory, and time-stamping at the beginning and end of the trap can indicate how much processor time was spent servicing it. It can be seen that a system with the capability of synchronising with the TRAP #0 instruction provides a very powerful debugging tool, and offers a first level of profiling capability. With increasing Digital Video title production and its associated high computational loads on a CD-I player, it is becoming increasingly important to be able to non-intrusively profile CPU activity.

The 68070 microprocessor which is at the heart of many CD-I players uses instruction pre-fetching to increase efficiency. This means that instruction codes are read from memory while the processor decodes the current instruction. This has the effect that microprocessor bus activity does not directly correlate to the sequence of instruction codes that constitute a program. The implication of this in detecting system calls is that the short stack frame does not always follow the fetch of the TRAP #0 opcode, as this instruction is fetched whilst the processor is decoding the previous instruction. The effect of the previous instruction (such as the clear of a memory location) may not appear on the system bus until after the trap instruction is fetched.

If an interrupt occurs during the sequence of events following a TRAP #0 then there is a danger that the debugging hardware will lose synchronisation with the player. However, as interrupt service routines frequently make systems calls themselves it is important to be able to reliably detect when an interrupt has occurred.

It is difficult to determine the occurrence of interrupts by monitoring bus activity alone. Although the external interrupt request and acknowledge lines can be monitored, the 68070 microprocessor has built in subsystems (such as the UART and DMAC) that also generate interrupts. There is no external signal that these interrupts are being processed.

When the processor detects that an interrupt is pending, it compares the interrupts priority with the priority of the task currently running, and only services the interrupt if its priority is higher. When the processor starts servicing an interrupt the vector is determined from the device which caused it, a short stack frame is written to the system stack, and the contents of the interrupt vector are read. Execution then continues from the address stored at the vector. Internally generated interrupts are autovectored and so no vector fetch is performed.

Instruction pre-fetching and interrupts can "spoil" the predictable sequence of bus activity that may otherwise provide the debugging system with useful information. The detection of events, therefore, relies on individual bus cycles.

Bus activity following a TRAP #0 instruction will now be described with reference to Listing 1, to be found at the end of this description. In the Listing, the respective columns from left to right represent: state number; processor read or write; address bus contents; data bus contents; and a comment or code disassembly. Note that the bus state is latched on the rising edge of Address Strobe (ASN).

A TRAP #0 is performed when a program wishes to make a system call. A typical code fragment is as follows:

| Address | 0x1A1F5A | Opcode: | 0x426A0008 | Assembler | clr.w8(a2) |
|---|---|---|---|---|---|
| | 0x1A1F5A | | 0x4E400084 | | os9 I$Open |

Here a clear word instruction is followed by a system call. Address 0x1A1F5E contains the TRAP #0 opcode (0x4E40), and the following address contains the system function code (0x0084 for I$Open). The bus activity following execution is shown in Listing 1 to which reference should now be made.

State 1–4: As can be seen, instruction prefetch has caused the bus activity to be in a different order to the assembler code. The trap opcode is fetched while the processor was calculating the effective address by adding 8 to the contents of register a2. Only after the instruction has been fetched does the memory write take place.

State 5–8: Following reading of the Trap #0 opcode (States 1–4), a short stack frame is stored on the system stack. The short stack frame consists of a header (containing 0x80—the offset of the vector for TRAP #0), the Program Counter (PC) where the TRAP #0 instruction is located, and the status word. The most significant nibble in the header word being zero indicates a short stack frame.

State 9–17: The given vector is read and a jump made to the address stored at that vector. After the processor commences operation from the vectors contents, two words are pushed onto the stack and then a far jump is performed. As may be seen, the two word push occurs between the far jump opcode and operand fetches due to the instruction pre-fetch.

State 18–19: All data and address registers (except the stack pointer a7) are saved to the stack.

State 20–33: Storage of the address registers on the stack.

State 34–49: Storage of the data registers on the stack.

State 50–64: Reading of the operating system base address. The last read from a5 loads the address of the system call function code from its storage pointed to by the stored PC within the short stack frame. Note that the fetches of the opcode and operand for this instruction have been interrupted by a write from the previous instruction.

State 65–66: Reading of the function code: this is a word defined after the TRAP instruction.

If the cartridge saves data concerning 64 cycles from the point that the TRAP #0 exception vector is read (state 9 of Listing 1) then the saved data allows the cartridge processor to determine the following information:

The contents of all registers from states 20 to 49.

The function code of the system call from the value of the data bus at state 66.

The address where the system call was made (from the address where the system code was fetched from in state 66).

Considering now the handling of the interrupts, the 68070 processor in the CD-I player accepts interrupts from a number of sources:

IN2,IN4,IN5 and NMI decoded interrupt signals.

INT1 and INT2 latched interrupt signals.

A built-in timer.

RS232 reception and transmission.

DMA channels 1 and 2.

Whilst the IN2, IN4 and IN5 decoded interrupt signals are available with their acknowledge lines on the expansion bus, they do not provide a complete indication of where an interrupt is occurring. Interrupts are also generated by the timing and DMA circuitry within the processor and there is no external indication that the processor is servicing an interrupt from one of these sources.

When an interrupt is signalled to the processor (be it internal or external) the processor only services it if it has a higher priority than the current task's priority. If this is the case then the vector is read from the device, a short stack frame is stored on the system stack, the contents of the vector address are read, and a jump is made to this address. An example of this is shown in Listing 2 (below) where the interrupt is serviced at state 2. Note that the vector offset in the stack frame header is 0x200, which is the vector (0x80) multiplied by 4 due to each vector entry having long word contents.

When an internal interrupt occurs (such as from the DMAC), there is no fetch of the interrupt vector. Instead, an internal autovector interrupt is generated. The code extract of Listing 3 shows such an interrupt occurring at state 51 of a system call (just after full register storage onto the system stack).

It can be seen that the value of Program Counter (PC) stored in the stack frame is the address from which the instruction at state 50 was fetched but not executed.

The code segments of Listings 2 and 3 show that an external interrupt causes the interrupt vector to be fetched from the interrupting device, whereas internal interrupts are autovectored. As has already been mentioned, the 68070 processor performs an instruction pre-fetch and it is after this instruction fetch that a switch to service a pending interrupt is made. If this occurs, the instruction opcode is discarded and the address from which it was fetched becomes the value of the far address that is stored in the stack frame. Interrupts are accordingly detected by a fetch of the interrupt vector from its storage location in the lowest 1 Kbyte of memory.

At the end of a trap or an interrupt, an RTE (return from exception) instruction is executed. The bus activity following an instance of this instruction may be as shown in Listing 4.

It can be seen that following execution of the RTE instruction, the short stack frame is removed from the system stack and the next instruction is fetched from the address stored within the stack frame.

When a subroutine is called the value of the Program Counter (PC) is stored on the stack. When a return from subroutine is made, the top value on the stack is removed and is used as the new value of the program counter. A return from subroutine can easily be detected by filtering for a read of the "Return from Subroutine" opcode (RTS) which has value 0x4E75. Subroutine calls are slightly more difficult to detect as there are several versions:

Jump Subroutine (JSR) with internally generated address such as JSR (a0) has a different opcode depending on the place where the subroutine is stored (a0, a1, etc). The instruction consists of a single word in the range 0x4E90 ... 0x4E97. Bus activity following this type of subroutine call is shown in Listing 5 below.

At state 0 the subroutine call opcode is read. At state 1 there is a useful read of the first opcode of the called subroutine. This is so the instruction can be decoded while the current PC is written onto the stack in states 2 and 3. In state 4 instruction processing continues in the new subroutine. Event detection is performed by filtering for a read of a word in the range 0x4E90 ... 0x4E97, and is delayed by a single CD-i bus cycle so that it occurs during state 1. This enables the address of the called subroutine to be store as part of the event data so that it can be compared to a stored symbol table.

Jump Subroutine (JSR) with address calculated using additional offset such as JSR 6(a0). This has a different opcode depending on the place where the subroutine is stored (a0, a1, etc) and also has an operand word following the opcode to specify the offset. The instruction consists of a single word in the range 0x4EA0 ... 0x4EA7. Event detection is performed by filtering for a read of a word in this range, and is delayed by a two CD-i bus cycle so that it skips over the offset read and again occurs during the opcode fetch from the new address subroutine. This again enables the address of the so-called subroutine to be stored as part of the event data so that it can be compared to a stored symbol table.

Branch Subroutine (BSR) with 8-bit displacement has a different opcode depending on the displacement, as the displacement is stored in the lower byte of the opcode word. The instruction thus consists of a single word in the range 0x6101 ... 0x61FF. Bus activity following this type of subroutine call is shown in Listing 6 below.

At state 0 the subroutine branch opcode is read. At state 1 there is a useful read of the first opcode of the called subroutine. This is so the instruction can be decoded while the current PC is written onto the stack in states 2 and 3. In state 4 instruction processing continues in the new subroutine. Event detection is performed by filtering for a read of a word in the range 0x6101 ... 0x61FF, and is delayed by a single CD-i bus cycle so that it occurs during state 1. This enables the address of the called subroutine to be stored as part of the event data so that it can be compared to a stored symbol table.

Branch Subroutine (BSR) with 16-bit displacement has the 8-bit displacement in the above case defined as 0x00, with a 16-bit offset word following the branch opcode. The instruction thus consists of the single word of 0x6100 followed by the 16-bit offset. Event detection is performed by filtering for a read of the 0x6100 word, and is delayed by a two CD-i bus cycle so that it skips over the offset read and again occurs during the opcode fetch from the new address subroutine. This again enables the address of the called subroutine to be stored as part of the event data so that it can be compared to a stored symbol table.

Direct Memory Access (DMA) cycles can be identified by monitoring signals active only during DMA read or writes. During these bus cycles the access is being made for DMA and not normal processing.

The monitoring device embodying the invention is in the form of a cartridge that fits into a development or production CD-I player in the same way as a Digital Video cartridge. The cartridge is concerned with the collection, analysis and storage of player bus activity, and communication with a host debugging system to provide results and allow run-time configuration of the collection and analysis algorithms. The host would be a suitably programmed computer such as a PC.

Figure 1:
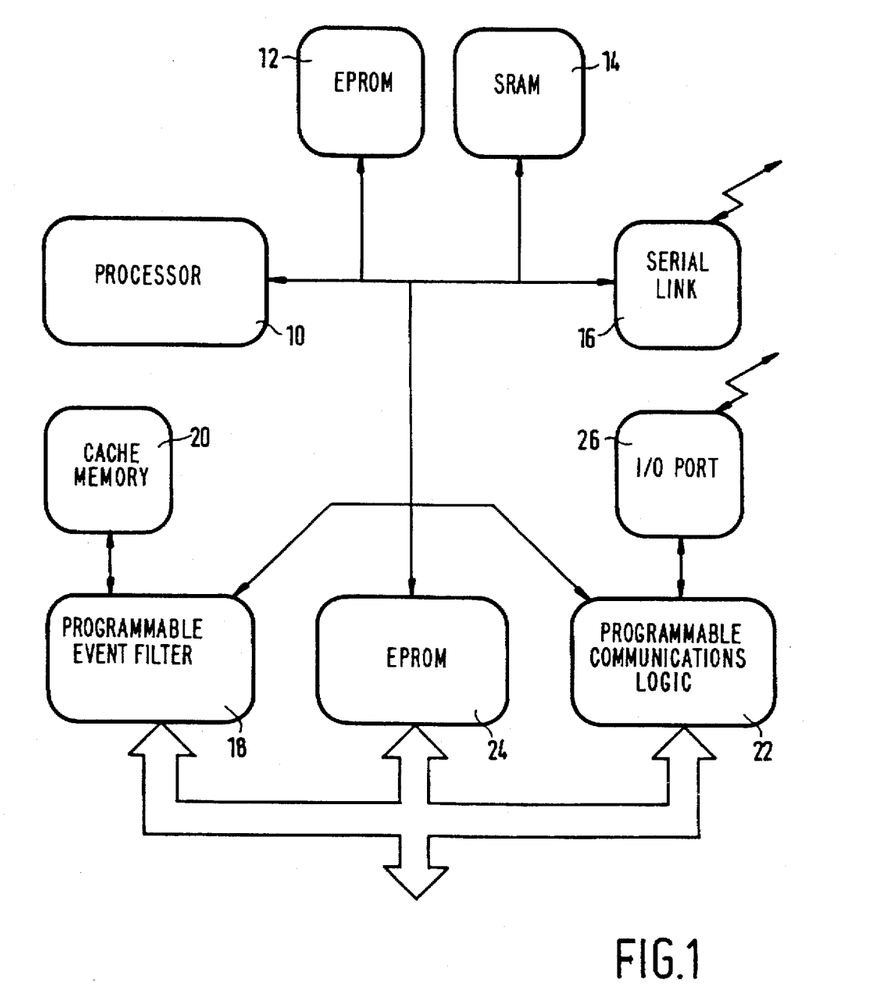
FIG. 1 is a block diagram of a monitoring cartridge, for a CD-I (Compact Disc-Interactive) player, embodying the invention.

A block diagram of the cartridge is shown in FIG. 1. The debugging cartridge is designed around a Motorola MC68340 microprocessor 10 based on the 68020 processing core. This is a high-performance 32-bit processor with additional integrated subsystems. These include a two-channel DMA controller, two timers/counters, a two-channel USART (Universal Synchronous/ Asynchronous Receiver/ Transmitter), and a SIM (System Integration Module) which performs system protection, evaluates chip selects and wait states, and contains a clock synthesizer, an external bus interface, and a bus arbitration manager. The device operates at up to 25 MHz.

The SIM allows four external chip select signals to be configured allowing simple interfacing with external memory (ROM storage, RAM storage, programmable logic configuration, and programmable logic internal registers in the case of the debugger). Up to three wait-states can be programmed (useful for relatively slow devices such as EPROMs) and dynamic bus sizing is also supported. A "global" chip select asserted on every bus cycle unless otherwise programmed eliminates the need for auxiliary address decoding for a boot ROM before system initialisation occurs.

Firmware is stored in a single 128 KByte 27C1024 EPROM device 12. The global chip select is preset to operate as a 16-bit port with 3-wait-states. With a 25 MHz clock rate this corresponds to an access time of 180 ns.

The firmware consists of the following elements:
Boot data and basic initialisation code.
Power-on self-test to verify cartridge operation.
BIOS routines (serial port primitives, etc) which are copied into RAM for speed.
A basic Command Line Interpreter (CLI) and associated routines for cartridge development.
Loader code to load and execute and operating system.
Library filter configuration files to minimise load time in use.

Suitably, cartridges may have a configuration of filter configuration files (discussed below) stored in EPROM to reduce load on the serial link and increase the rate of filter programming.

The debugging task requires a considerable amount of fast volatile memory. The easiest way to provide this is to use a SRAM device 14 as this does not require periodic refreshing and it is available at very fast access rates. Up to 4 Mbytes of SRAM devices may be added to the cartridge in 1 MByte modules. During cartridge initialisation the available memory is determined and partitioned between the following areas:

System data area (interrupt vectors, stack, etc).
BIOS routine area (serial port primitives, buffers etc).
Operating system area (code, data, buffers etc.)
Event data storage area (data read from event cache but not yet processed).
Processed event storage area (back-trace buffer, event stacks, etc).
Loaded filter configuration files. This prevents filter designs having to be loaded over the serial link (to be described) more than once.

Address decoding is performed by two fast programmable logic devices to enable byte or word access to the complete address range. As high performance SRAM devices are expensive, it is contemplated that a cheaper DRAM device could be used at the risk of a reduction in performance.

A high-speed serial link 16 is provided for communication between the cartridge and the debugging host, with both serial communication channels of the 68340 microprocessor used. The first channel provides full-duplex communication with a standard terminal. This can be used in association with the cartridge CLI and associated routines to analyze cartridge operation and performance, and to test cartridge subsystems. Communication is at 9600 baud, with flow control achieved using RTS and CTS signals.

The second channel provides full-duplex communication with the debugging host using an appropriate protocol. It is used for all communication between the debugging host and cartridge concerned with configuration and event reporting. Communications are at 19200 baud, and again flow control is achieved using RTS and CTS signals.

Under control of software running on the debugging host an event or set of events are selected from a menu in order to perform a specific debugging function. The host software then downloads an appropriate configuration file (approximately, 8 KB in size) to the cartridge which then configures a programmable event filter 18, if that file is not already present in the cartridge.

The programmable filter is implemented using a 9000-gate Field Programmable Gate Array (FPGA). This contains 320 Combinational Logic Blocks (CLBs) that can be configures and connected to perform a given function. A number of filter designs are required due to the limited functionality that such a device can offer. However, in all of the designs there are the same modules, namely event filters, a cache RAM memory controller and means for time stamp generation.

A number of event filters monitor signals on the CD-i expansion bus and trigger when a condition occurs. This may occur when a DMA cycle is in progress, when a particular memory address is accessed, when a system call occurs, when a subroutine is called or returns, when an interrupt occurs or returns, and so on. Registers within the filters provide a means of flexibility. Specific filters may be disabled, and a filter for a memory address access may contain a register which holds the address that the user is interested in.

When an event is detected, one or two things can happen. The event detection circuitry may either save an event frame consisting of parameters associated with the event (data bus, address bus, time-stamp, etc) into event cache memory 20, or it may start dumping all subsequent bus activity into the event cache for detailed analysis at a later stage. The event cache memory operates as a FIFO storage area. The cache controller circuitry within the FGPA maintains address generation for writes of event data as eve its occur or reads of event data by the processor.

When an event occurs, the event frame written into event cache memory 20 contains a time-stamp. This may be either an incrementing count giving resolution to the order of microseconds, or a time-stamp based on frame/line information of the CD-I player video circuitry.

The programmable filter 18 controls all accesses to the event cache memory 20, which is suitably 128 K Bytes in size. The address, data and control signals associated with the event cache memory are managed by the programmable filter 18.

Writes to the memory occur after an event occurs, and may consist of either an event frame or a dump of CD-I player expansion bus activity following an event. Reads from the memory are performed by a read of a register within the programmable filter logic. This ensures that there is no direct connection between the processor 10 and cache memory 20, and hence write latency is non-existent. This is important as write timing is critical due to the fast speed of the CD-i expansion bus. Signals are available to the processor indicating the "fullness" of the FIFO buffer.

A programmable communications logic device 22 (a 4200 gate FPGA) provides a number of important facilities to the debugging environment, including map register and address decoding for Mappable EPROMS, Parallel Communication Circuitry, and Interrupt Generation Circuitry.

The cartridge suitably contains two 16 KBytes EPROMS which are mapped into the CD-i memory space. The space address of these EPROMS is set by the cartridge by writing the value into a register within the communication logic. Typically, these EPROMs will contain a number of OS-9 modules. After writing the base address into the register the CD-i player can be reset so that the modules will be located during player initialisation.

The communications logic can generate an interrupt to the CD-i player and supply a vector. This vector is obtained from a register within the communications logic. This enables normal CD-i operation to be interrupted either under host software command, or when a particular event is detected. If wished, the vector could make the CD-i player jump to execute from the mappable EPROM memory. In this way, the cartridge permits traditional debugging to be carried out as well as non-intrusive bugging.

For high speed data transfer between the CD-i and either debugging host or the cartridge, the communications logic provides a bi-directional parallel communications link. This provides the required interface for eight bi-directional data signals and the STROBE and ACK flow control signals.

A 32 KByte EPROM storage area 24 is provided for OS-9 modules that are to be included in the CD-i player memory map. This enables traditional "break and analyze" features to be implemented by writing a suitable debugging OS-9 module. Another module may provide a high-level communications interface between the player and cartridge using the primitive communication capability provided by the programmable communications logic but appearing to the CD-i operating system like a pipe. A further module could make the primitive parallel communication capability appear to the CD-i operating system like a virtual disc. Address decoding for the mappable storage is performed by the communications logic, with the base address being set by a register within the logic.

A parallel I/O port 26 for the cartridge provides a facility for fast bidirectional (where the host supports this) communication between the debugging host and the CD-i player. As not all hosts support reads through the parallel port as well as writes, directional control is managed by the host using a control signal.

Figure 2:
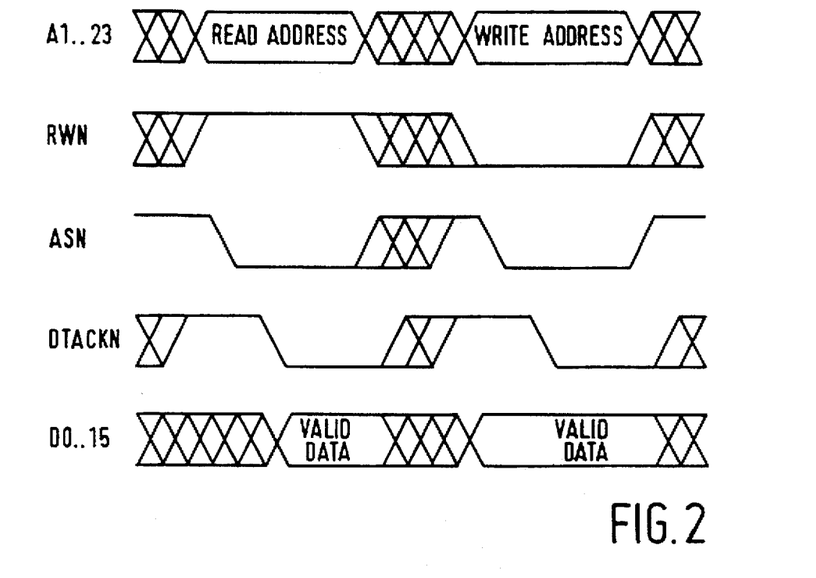
FIG. 2 is a timing diagram for Read and Write cycle timing.

The hardware responsible for detecting, analysing and storing data relating to system calls and interrupts, needs to synchronise with the 68070 signals in order to perform analysis of bus activity. This is performed by latching bus states on the rising edge of ASN. This signal is asserted by the processor at the end of a bus cycle when data is either received from or placed on the bus. A timing diagram for the read and write cycles is shown in FIG. 2.

During operation, the cartridge accepts signals on the address, data and control buses, and provides the 68340 with information when the required instructions or events are detected. This provides a great amount of filtering between bus activity on the player's expansion bus and the processor in the debugger, leaving the processor free to manage event processing and host communication.

Figure 3:
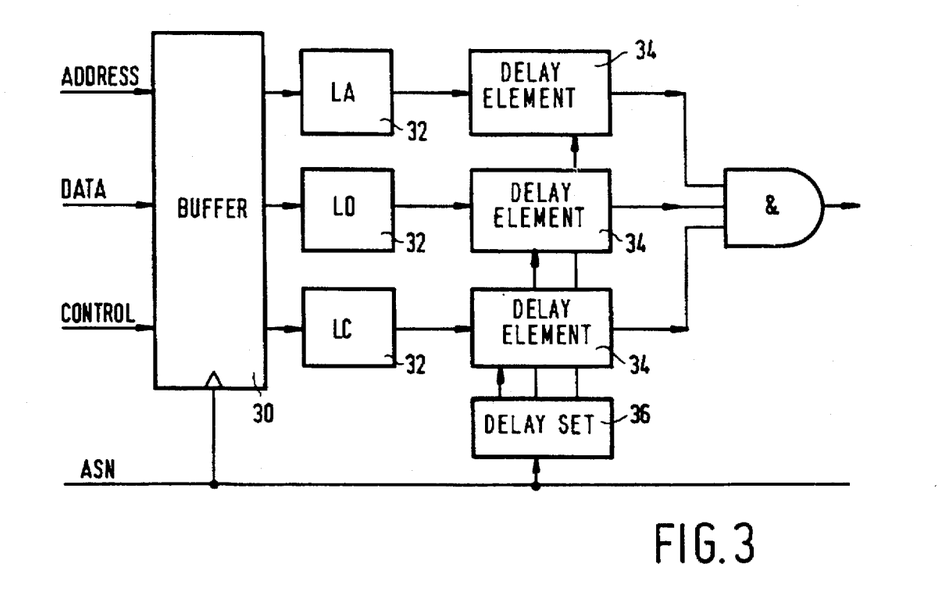
FIG. 3 shows a stage in an alternative embodiment of the programmable logic unit shown in FIG. 1; and Listings 1 to 11 are code segments illustrative of operation of features of the monitoring cartridge.

As shown in FIG. 3, the programmable event filter 18 (FIG. 1) consists of buffer circuitry 30 for the players address, data, and control busses, followed by respective comparators 32 and delay elements 34 to allow detection of specific patterns of bus activity. Control circuitry (not shown) is also provided for management of the cache memory 20 (FIG. 1). For discussion of analysis circuitry, the outputs of the buffer circuitry are labelled LA (Latched Address) LD (Latched Data) and LC (Latched Control). An important element of LC is LRWN (Latched Read/Write). These labels are appended with the output of a comparator delayed n cycles, where n is an integer value set by delay setting means 36 strobed by the ASN signal. Thus "LA3= 0x123456" represents a boolean signal that is true three bus cycle periods after the address bus has value 123456 hexadecimal. By way of example of the operation of the trigger, detection of the following events will be considered:

The generation of a stack frame (trap or interrupt)—Event code #1.

The removal of a stack frame (end of exception)—Event code #2.

Instruction to save all registers on the stack.—Event code #3.

Instruction to fetch the system call function code.—Event code #4.

The processor maintains a stack of currently active exceptions, a buffer of exceptions to analyze, and a host management scheme to report its findings and receive commands. During normal operations it is communicating with the host and processing events which it finds in a buffer. These events consist of a header and a data area. The header defines the types of event and the data area (the size of which is dependent on the type of event) contains additional data related to the event. For example, the data area relating to the generation of a stack frame would contain the instruction address at which the exception occurred, the system stack pointer at the time the exception occurred, and the status register as stored in the stack frame. In addition to this, a state counter and/or timing information may be stored. In processing the information in the event buffer, the processor can decode which events needs to be placed in the exception stack, whether a given exception has finished, what needs to be reported to the host, how well the processor is processing the data (is the buffer going to overflow), and so on.

Detection of stack frame generation (Event code #1) indicates that a trap or interrupt has occurred. The condition for this may be as shown in Listing 7.

Note that the conditions on the right require only comparison and masking which could be done easily with a small number of gates. On detecting this sequence, the filter would generate an interrupt to the processor. The processor could read the following information:

LD6 provides the vector of the exception.

LA6, for example, could provide the system stack pointer before the exception.

LD5 and LD4 together provide the execution address where the exception occurred.

LD3 provides the status register.

LD2 and LD1 together provide the value of the exception vector.

Once the processor has read this information from the filter it could generate a new entry in the event buffer containing this information.

Detection of stack frame removal (Event code #2) indicates that the processor has finished exception processing. The condition for this may be as shown in Listing 8.

On detecting this sequence, the filter would generate an interrupt to the processor. The processor could read the following information:

LD4 provides the vector of the exception which is being returned.

LA4 provides the address; of the start of the stack frame.

LD2 and LD1 together provide the execution address where the exception occurred.

LD3 provides the status register that was stored.

The processor could again create a new event buffer with this information.

Detection of instruction to save machine registers (Event code #3) allows the processor to grab each of the register's contents as they were saved on the system stack. This occurs during the trap code and provides access to the parameters passed to the system call. As systems calls occur at significant points during the execution of programs, the detection of this event would provide a valuable tool for the debugging of CD-i applications. The condition for this event may be as shown in Listing 9.

On detecting this sequence, the filter would generate an interrupt to the processor. The processor could read the following information:

LA1 provides the address of the start of the instruction.

The processor could watch each of the registers being written to the system stack and could store them in a new event buffer entry.

Detection of an instruction to fetch the system call function code (Event code #4) allows the processor to identify which system function is being called. This occurs during the trap code. The condition for this may be as shown in Listing 10.

On detecting this sequence, the filter would generate an interrupt to the processor. The processor could read the following information:

LA1 provides the address of the start of the instruction.
LA0 provides the address of the function code.

The processor could store this information in a new event buffer entry.

The processor considers events stored in the event buffer 20 on a FIFO basis. The buffer allows for the uneven nature of exception timing to be absorbed prior to analysis. Considering, as an example the analysis that the processor will perform if the next event in the buffer is an event of code #2, end of exception. The processor can match some of the attributes of the stack frame that was removed with those of the exception on the top of the exception stack. Provided they match, the host can be notified of an end of exception if required, and the exception can be removed from the top of the stack. The stack thus forms a record of the current trap/interrupt history. Generation of a stack frame (event #1) would cause addition of a new event to the top of the exception stack.

An example of real time non-intrusive debugging using the cartridge will now be described with reference to Listing 11. The task is concerned with detecting modules of data being unloaded into a CD-i player's memory map from a data source (typically a compact disc). All OS-9 modules have a standard format which includes a header consisting of a number of fields including those describing the modules length, type (code or data etc.), and header checksum. When a module is loaded into memory, the header checksum is evaluated by the OS-9 code and compared with the value stored in the checksum field of the header. This provides a quick indication that the header has been loaded without corruption. The operating system code that performs this task is within the core OS-9 module called "kernel". By using knowledge of this code, the cartridge watches the checksum being evaluated and hence detects modules being loaded in real time. The bus activity during the period of checksum evaluation is shown in Listing 11.

Cycles (states) 905 and 906 load tie d1 register with the size of the header to check. The header is 2 Ehex bytes long, and the shift at cycle 906 takes into account that the header will be checked using word accesses rather than byte accesses. At cycle 907 the evaluated checksum is initialised to FFhex. The evaluation loop starts at cycle 908: here the next word in the module header is read into the d0 register. The first such read can be seen at cycle 909. Cycle 910 uses the standard method of checksum evaluation to 'add' the new value by exclusive-ORing the new value to the current checksum value. Cycles 911 and 912 cause the loop to repeat if checksum evaluation has not finished.

The filter used to provide data for module detection triggers on a read to the "moveq #$2E,d1" instruction. After this is detected (by a read to address 0x18A1FC) the filter saves data about the following 64 cycles into the event cache 20 (FIG. 1). The saved data includes the address, data and control bus values for each cycle, and thus shows the checksum evaluation loop taking place. The cartridge processor 10 (FIG. 1) can thus detect where the new module is located in memory (from the first header-field access at cycle 909), and from fields within the header such as length and type. This data is then sent to the debugging host PC for the attention of the user.

As this data is captured in real-time following a trigger based on knowledge of the operating system, the CD-i player continues to function as normal, unaffected by the debugging task being performed.

The system described hereinabove provides an approach to the problem of filtering bus signals and analyzing the resulting events. Analysis of the event buffer allows particular system calls or interrupts to be detected and reported to the host debugging system together with such attributes as timing information, stack painters and parameters for system calls.

From reading the present disclosure, other variations will be apparent to persons skilled in the art. Such variations may involve other features which are already known in the design, manufacture and use of monitoring and debugging systems, devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of monitoring the operation of a processor-based device including a bus and programmed with an assembly level program, the method comprising the steps of:

determining an electronic signal of the device representative of a predetermined assembly-level processor operating system event;

monitoring, from a position external to the processor operating system, for occurrence of said representative signal on a signal path of the device; and on detection of occurrence of the said representative signal, capturing and reporting predetermined details of the processor operating system event including all bus signals for a predetermined period following the processor operating system event.

2. A method according to claim 1, wherein said processor based device includes a memory and the step of capturing and reporting includes, where the detected event results in access to a predetermined memory location, reporting information as to what was read from or written to said memory location.

3. A method according to claim 1, in which the step of capturing and recording includes adding a time stamp to the captured predetermined details to indicate the point of the processor operating system event occurrence.

4. A method according to claim 1, in which a data bus of the processor based device is monitored, and said electronic signal is a predetermined data word.

5. A method according to claim 1, in which an address bus of the process based device is monitored, and the said electronic signal is a predetermined memory address.

6. Apparatus for monitoring the operation of a processor-based device programmed according to an assembly-level program, said apparatus comprising:

filter means connectable to a signal path, including a bus, of the processor based device and for detecting occurrence of at least one predetermined electronic signal of the device representative of a particular assembly-level level processor operating system event including all bus signals for a predetermined period following the processor operating system event;

an event cache memory connected to the filter means, the filter means for writing preselected event details to the cache memory on detection of the event;

an event data memory, connected to the filter means, for storing the event details read from the cache memory via the filter means; and processor circuitry connected to, and controlling operation of, the filter means and event data memory.

7. Apparatus according to claim 6, in which the filter means is a programmable device which is externally controllably configurable to detect at least one from among predetermined device signals.

8. Apparatus according to claim 7, further comprising filter configuration file storage means connected to the filter means and storing information defining at least one filter configurations.

9. Apparatus according to claim 6, in which the processor circuitry reads event details from a first area of the event data memory, process the event details, and write processed event details to a further area of the event data memory.

10. Apparatus according to claim 6, further comprising debugging means connectable to said signal path and for interrupting operation of said processor-based device.

11. Apparatus according to claim 10 further comprising:

a programmed host device operating data processing algorithms, said algorithms being determined by knowledge of the processor-based device operating system, and a bidirectional communications link connected between the processor based device and the host device.

12. Apparatus according to claim 6, further comprising a bidirectional communications port connected with the processor, filter means and event data memory.

13. A method of monitoring the operation of a processor-based device programmed with an assembly level program, the method comprising the steps of:

determining an electronic signal of the device representative of a predetermined assembly-level processor operating system event;

monitoring, from a position external to the processor operating system, for occurrence of said representative signal on a signal path of the device as the device is operating; and on detection of occurrence of said representative signal, capturing and reporting predetermined details of the processor operating system event.

14. Apparatus for monitoring the operation of a processor-based device programmed according to an assembly-level program, said apparatus comprising:

filter means connectable to a signal path of the processor-based device and for detecting occurrence of at least one predetermined electronic signal of the device representative of a particular assembly-level processor operating system event as the device is operating;

an event cache memory connected to the filter means, the filter means for writing preselected event details to the cache memory on detection of the event;

an event data memory, connected to the filter means, for storing the event details read from the cache memory via the filter means; and processor circuitry connected to, and controlling operation of, the filter means and event data memory.

* * * * *